(12) United States Patent
Shin et al.

(10) Patent No.: US 9,229,937 B2
(45) Date of Patent: Jan. 5, 2016

(54) APPARATUS AND METHOD FOR MANAGING DIGITAL CONTENTS DISTRIBUTED OVER NETWORK

(75) Inventors: Ho Chul Shin, Suwon-si (KR); Young Kyu Bae, Suwon-si (KR); Chul Seung Kim, Seoul (KR); Yun Je Oh, Yongin-si (KR); Joon Oo Kim, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1390 days.

(21) Appl. No.: 11/696,784

(22) Filed: Apr. 5, 2007

(65) Prior Publication Data

US 2007/0239668 A1    Oct. 11, 2007

(30) Foreign Application Priority Data

Apr. 6, 2006   (KR) .................. 10-2006-0031536

(51) Int. Cl.
*G06F 17/30*   (2006.01)
(52) U.S. Cl.
CPC ............... *G06F 17/30017* (2013.01)
(58) Field of Classification Search
CPC ................................. G06F 17/30017
USPC ................................................ 707/10
See application file for complete search history.

(56) References Cited

U.S. PATENT DOCUMENTS

| | | | |
|---|---|---|---|
| 2,187,432 A | 1/1940 | Powers | |
| 2,644,113 A | 6/1953 | Etzkom | |
| 3,050,654 A | 8/1962 | Toulon | |
| 3,264,073 A | 8/1966 | Schmitt et al. | |
| 3,365,315 A | 1/1968 | Beck et al. | |
| 3,602,754 A | 8/1971 | Pfaender et al. | |
| 3,607,169 A | 9/1971 | Coxe | |
| 3,646,384 A | 2/1972 | Lay | |
| 3,652,891 A | 3/1972 | Janning | |
| 3,654,680 A | 4/1972 | Bode et al. | |
| 3,666,981 A | 5/1972 | Lay | |
| 3,674,461 A | 7/1972 | Farnand et al. | |
| 3,699,050 A | 10/1972 | Henderson | |
| 3,793,041 A | 2/1974 | Sowman | |
| 3,811,061 A | 5/1974 | Nakayama et al. | |

(Continued)

FOREIGN PATENT DOCUMENTS

| | | | |
|---|---|---|---|
| JP | 08287166 A | * 11/1996 | |
| KR | 2001-68478 | 7/2001 | .............. G06F 15/16 |

(Continued)

*Primary Examiner* — Grace Park
(74) *Attorney, Agent, or Firm* — Cha & Reiter, LLC (57) ABSTRACT

A content management system entails analyzing similarity of the contents distributed among at least one network element (e.g., contents server) and managing the contents on the basis of the analysis result. The content management server analyzing similarities of content files and providing the similarities information includes a communication unit that collects content information from at least one content server stored the content files and the content information corresponding to the content files; a digital content management (DCM) control unit which analyzes similarities of the content files received from the content server; a storage which stores information on the similarities analyzed by the DCM control unit; a content information comparison unit which detects the content information in response to a similar content file request transmitted from a client on the basis of the similarities information.

28 Claims, 11 Drawing Sheets

(56) References Cited

U.S. PATENT DOCUMENTS

| | | | |
|---|---|---|---|
| 3,838,998 A | 10/1974 | Matthews et al. | |
| 3,848,248 A | 11/1974 | MacIntyre | |
| 3,860,846 A | 1/1975 | Mayer | |
| 3,885,195 A | 5/1975 | Amano | |
| 3,916,584 A | 11/1975 | Howard et al. | |
| 3,927,342 A | 12/1975 | Bode et al. | |
| 3,935,494 A | 1/1976 | Dick et al. | |
| 3,964,050 A | 6/1976 | Mayer | |
| 3,969,718 A | 7/1976 | Strom | |
| 3,975,194 A | 8/1976 | Farnand et al. | |
| 3,990,068 A | 11/1976 | Mayer et al. | |
| 3,998,618 A | 12/1976 | Kreik et al. | |
| 4,027,188 A | 5/1977 | Bergman | |
| 4,035,690 A | 7/1977 | Roeber | |
| 4,038,577 A | 7/1977 | Bode et al. | |
| 4,075,025 A | 2/1978 | Rostoker | |
| 4,106,009 A | 8/1978 | Dick | |
| 4,119,422 A | 10/1978 | Rostoker | |
| 4,126,807 A | 11/1978 | Wedding et al. | |
| 4,126,809 A | 11/1978 | Wedding et al. | |
| 4,133,854 A | 1/1979 | Hendricks | |
| 4,163,637 A | 8/1979 | Hendricks | |
| 4,164,678 A | 8/1979 | Biazzo et al. | |
| 4,166,147 A | 8/1979 | Lange et al. | |
| 4,257,798 A | 3/1981 | Hendricks et al. | |
| 4,279,632 A | 7/1981 | Frosch et al. | |
| 4,290,847 A | 9/1981 | Johnson et al. | |
| 4,303,061 A | 12/1981 | Torobin | |
| 4,303,431 A | 12/1981 | Torobin | |
| 4,303,432 A | 12/1981 | Torobin | |
| 4,303,433 A | 12/1981 | Torobin | |
| 4,303,603 A | 12/1981 | Torobin | |
| 4,303,729 A | 12/1981 | Torobin | |
| 4,303,730 A | 12/1981 | Torobin | |
| 4,303,731 A | 12/1981 | Torobin | |
| 4,303,732 A | 12/1981 | Torobin | |
| 4,303,736 A | 12/1981 | Torobin | |
| 4,307,051 A | 12/1981 | Sargeant et al. | |
| 4,314,827 A | 2/1982 | Leitheiser et al. | |
| 4,322,378 A | 3/1982 | Hendricks | |
| 4,344,787 A | 8/1982 | Beggs et al. | |
| 4,349,456 A | 9/1982 | Sowman | |
| 4,363,646 A | 12/1982 | Torobin | |
| 4,391,646 A | 7/1983 | Howell | |
| 4,392,988 A | 7/1983 | Dobson et al. | |
| 4,415,512 A | 11/1983 | Torobin | |
| 4,459,145 A | 7/1984 | Elsholz | |
| 4,494,038 A | 1/1985 | Wedding et al. | |
| 4,525,314 A | 6/1985 | Torobin | |
| 4,542,066 A | 9/1985 | Delzant | |
| 4,547,233 A | 10/1985 | Delzant | |
| 4,548,196 A | 10/1985 | Torobin | |
| 4,548,767 A | 10/1985 | Hendricks | |
| 4,568,389 A | 2/1986 | Torobin | |
| 4,582,534 A | 4/1986 | Torobin | |
| 4,596,681 A | 6/1986 | Grossman et al. | |
| 4,618,525 A | 10/1986 | Chamberlain et al. | |
| 4,637,990 A | 1/1987 | Torobin | |
| 4,638,218 A | 1/1987 | Shinoda et al. | |
| 4,671,909 A | 6/1987 | Torobin | |
| 4,713,300 A | 12/1987 | Sowman et al. | |
| 4,737,687 A | 4/1988 | Shinoda et al. | |
| 4,743,511 A | 5/1988 | Sowman et al. | |
| 4,743,545 A | 5/1988 | Torobin | |
| 4,757,036 A | 7/1988 | Kaar et al. | |
| 4,777,154 A | 10/1988 | Torobin | |
| 4,778,502 A | 10/1988 | Garnier et al. | |
| 4,793,980 A | 12/1988 | Torobin | |
| 4,797,378 A | 1/1989 | Sowman | |
| 4,800,180 A | 1/1989 | McAllister et al. | |
| 4,865,875 A | 9/1989 | Kellerman | |
| 4,879,321 A | 11/1989 | Laroche | |
| 4,883,779 A | 11/1989 | McAllister et al. | |
| 4,963,792 A | 10/1990 | Parker | |
| 5,017,316 A | 5/1991 | Sowman | |
| 5,053,436 A | 10/1991 | Delgado | |
| 5,069,702 A | 12/1991 | Block et al. | |
| 5,077,241 A | 12/1991 | Moh et al. | |
| 5,185,299 A | 2/1993 | Wood et al. | |
| 5,212,143 A | 5/1993 | Torobin | |
| 5,225,123 A | 7/1993 | Torobin | |
| 5,326,298 A | 7/1994 | Hotomi | |
| 5,793,158 A | 8/1998 | Wedding | |
| 5,907,841 A * | 5/1999 | Sumita et al. ..................... 707/6 |
| 5,984,747 A | 11/1999 | Bhagavatula et al. | |
| 6,255,777 B1 | 7/2001 | Kim et al. | |
| 6,368,708 B1 | 4/2002 | Brown et al. | |
| 6,397,231 B1 * | 5/2002 | Salisbury et al. ............. 715/234 |
| 6,496,802 B1 * | 12/2002 | van Zoest et al. ................ 705/14 |
| 6,545,422 B1 | 4/2003 | George et al. | |
| 6,570,335 B1 | 5/2003 | George et al. | |
| 6,612,889 B1 | 9/2003 | Green et al. | |
| 6,620,012 B1 | 9/2003 | Johnson et al. | |
| 6,633,117 B2 | 10/2003 | Shinoda et al. | |
| 6,646,388 B2 | 11/2003 | George et al. | |
| 6,650,055 B2 | 11/2003 | Ishimoto et al. | |
| 6,677,704 B2 | 1/2004 | Ishimoto et al. | |
| 6,762,566 B1 | 7/2004 | George et al. | |
| 6,764,367 B2 | 7/2004 | Green et al. | |
| 6,791,264 B2 | 9/2004 | Green et al. | |
| 6,794,812 B2 | 9/2004 | Yamada et al. | |
| 6,796,867 B2 | 9/2004 | George et al. | |
| 6,801,001 B2 | 10/2004 | Drobot et al. | |
| 6,822,626 B2 | 11/2004 | George et al. | |
| 6,836,063 B2 | 12/2004 | Ishimoto et al. | |
| 6,836,064 B2 | 12/2004 | Yamada et al. | |
| 6,839,700 B2 * | 1/2005 | Doyle et al. ..................... 707/2 |
| 6,841,929 B2 | 1/2005 | Ishimoto et al. | |
| 6,857,923 B2 | 2/2005 | Yamada et al. | |
| 6,864,631 B1 | 3/2005 | Wedding | |
| 6,893,677 B2 | 5/2005 | Yamada et al. | |
| 6,902,456 B2 | 6/2005 | George et al. | |
| 6,914,382 B2 | 7/2005 | Ishimoto et al. | |
| 6,917,351 B1 | 7/2005 | Wedding et al. | |
| 6,930,442 B2 | 8/2005 | Awamoto et al. | |
| 6,932,664 B2 | 8/2005 | Yamada et al. | |
| 6,934,702 B2 * | 8/2005 | Faybishenko et al. ............ 707/3 |
| 6,935,913 B2 | 8/2005 | Wyeth et al. | |
| 6,969,292 B2 | 11/2005 | Tokai et al. | |
| 6,975,068 B2 | 12/2005 | Green et al. | |
| 7,005,793 B2 | 2/2006 | George et al. | |
| 7,025,648 B2 | 4/2006 | Green et al. | |
| 7,049,748 B2 | 5/2006 | Tokai et al. | |
| 7,054,927 B2 * | 5/2006 | Ulrich et al. ................... 709/223 |
| 7,083,681 B2 | 8/2006 | Yamada et al. | |
| 7,122,961 B1 | 10/2006 | Wedding | |
| 7,125,305 B2 | 10/2006 | Green et al. | |
| 7,137,857 B2 | 11/2006 | George et al. | |
| 7,140,941 B2 | 11/2006 | Green et al. | |
| 7,157,854 B1 | 1/2007 | Wedding | |
| 7,176,628 B1 | 2/2007 | Wedding | |
| 7,208,203 B2 | 4/2007 | Yamada et al. | |
| 7,228,319 B1 * | 6/2007 | Fuchs ........................... 707/204 |
| 7,247,989 B1 | 7/2007 | Wedding | |
| 7,288,014 B1 | 10/2007 | George et al. | |
| 7,307,602 B1 | 12/2007 | Wedding et al. | |
| 7,375,342 B1 | 5/2008 | Wedding | |
| 7,512,611 B2 * | 3/2009 | Yoshizawa .................... 707/100 |
| 2003/0009527 A1 * | 1/2003 | McIntyre et al. ............. 709/206 |
| 2004/0133589 A1 * | 7/2004 | Kiessig et al. ................ 707/102 |
| 2005/0027673 A1 * | 2/2005 | Moritani et al. ....... 707/999.001 |
| 2006/0020589 A1 * | 1/2006 | Wu et al. .......................... 707/3 |
| 2006/0195553 A1 * | 8/2006 | Nakamura ..................... 709/219 |

FOREIGN PATENT DOCUMENTS

| | | | |
|---|---|---|---|
| KR | 2002-90024 | 11/2002 | ............. G06F 17/00 |
| KR | 2003-29410 | 4/2003 | ............. G06F 17/30 |
| KR | 2004-6027 | 1/2004 | ............. G06F 17/00 |
| KR | 2004-32536 | 4/2004 | ............. G06F 17/00 |

* cited by examiner

APPARATUS AND METHOD FOR MANAGING DIGITAL CONTENTS DISTRIBUTED OVER NETWORK

CLAIM OF PRIORITY

This U.S. non-provisional application claims priority under 35 U.S.C. §119 from Korean Patent Application No. 2006-0031536, which was filed in the Korean Intellectual Property Office on Apr. 6, 2006, the contents of which are incorporated by reference herein in their entirety.

BACKGROUND OF THE INVENTION

1. Field of the Invention

The present invention relates to an apparatus and method for managing digital contents and, in particular, to a contents management server and method that analyze similarity of the contents distributed among at least one network element (e.g., contents server) and manage the contents on the basis of the analysis result.

2. Background of the Related Art

In recent years, as digital content has been widely used, the need to effectively manage a digital contents file emerges as an issue. In order to effectively manage content, there has been developed a digital content management (DCM) engine for analyzing similarity among digital contents files stored in the network elements.

In the meantime, home network systems have been progressed and the Digital Living Network Alliance (DLNA) has been proposed as a standard for home networking.

The DLNA is an alliance of leading members including Microsoft Corporation, International Business Machines Corporation, Hewlett-Packard Company, Intel Corporation, SONY Corporation, Panasonic Corporation, SAMSUNG Electronics Co., ltd., etc. for developing industry standards to allow products from all companies to be compatible with each other and to enable a network of electronic devices such as TV, VCR, digital camera, and audio components in the home. The DLNA has also focused on interoperability between networked entertainment and media devices for personal media uses involving imaging, audio and video.

The DLNA home network can be implemented on the basis of a wired network standard (IEEE 802.3) or a wireless network standard (IEEE 802.11), which interconnect a home server, a home gateway, and other devices such as Mobile-Digital Media Server (M-DMS), Mobile-Digital Media Renderer (M-DMR), and Mobile-Digital Media Player (M-DMP).

In particular, the DLNA guideline divides the home network devices into a Digital Media Server (DMS), and a Digital Media Player (DMP) or Digital Media Renderer (DMR), and specifies the interoperability between the DMS and DMP or DMR.

DMS assumes the function of a Media Server Device (MSD) under the Universal Plug and Play (UPnP) Audio-Visual (AV) part, which provides media contents. The main objective of the DMS is to enable the control point (CP) as a user interface (UI) application to retrieve digital media content items in the DMS such that the user can display or distribute the contents. The DMS is equipped with a broadcast signal receiver and middleware for broadcast. Some examples of DMS includes Video Cassette Recorders (VCRs), Compact Disc (CD) players, Digital Video Disk (DVD) players, Motion Pictures Expert Group 1 (MPEG-1) layer 3 (MP3) players, set-top boxes (STBs), TV tuners, radio tuners, personal computers (PCs), etc.

The DMR plays content received after being setup by another entity. Some examples of DMR devices include a TV, an audio/video receiver, a video monitor, and remote speakers for music.

The DMP is a DMR or M-DMR including the CP functioning to find content exposed by the DMS so as to afford playback and rendering capabilities.

One of the key technologies of utilized in the DLNA guidelines e.g., Home Networked Device Interoperability Guidelines v1.5, is UPnP. DMSs and DMPs are addressed and automatically recognized on the basis of the protocol specified in the UPnP device architecture. For example, the UPnP Media Server is the DMS providing a list of stored files and broadcasting the data.

The DLNA guidelines are based on the UPnP protocol and specify the design architecture of digital information products. Such digital information products as household appliances, PCs, and wireless devices can accordingly share media content over the wired or wireless home network.

Although the DLNA system enables the network elements to share multimedia content, the DCM engine can perform the similarity analysis only for the contents files stored in the local device; there thus exists no effective management for the multimedia contents distributed over the network.

Instead, even though the similarity analyses can be performed for all the respective network devices, this entails all network devices equipped with the DCM engines performing a similarity analysis on their, respective locally stored contents files. As a result, much central processing unit (CPU) processing overhead is wasted.

The arrangement is further disadvantageous in that the issuing of similarity analysis requests for all the network devices having DCM engines represents an inconvenient management burden.

SUMMARY OF THE INVENTION

The present invention has been made in an effort to solve the above problems, and, in one aspect, provides an apparatus and method for managing digital content distributed over a network.

More particularly, a content server for storing content files includes a storage unit which stores the content file; a communication unit which transmits content information in response to a content information request received from a content management server; and a control unit which transfers the content information on the content file corresponding to the content information request from the storage to the communication unit and transfers the content file from the storage to the communication unit in response to a content file request.

In another aspect of the present invention, the above and other aspects can be accomplished by a content management server which analyzes similarities of the contents files and provides the information on the similarities. The content management server includes a communication unit which collects content information from at least one content server stored the content files and the content information corresponding to the content files; a digital content management (DCM) control unit which analyzes similarities of the content files received from the content server; a storage unit which stores information on the similarities analyzed by the DCM control unit; a content information comparison unit which detects the content information in response to a similar content file request transmitted from a client on the basis of the similarities information.

In a further aspect of the present invention, the above and other aspects can be accomplished by a content management method for a content management server which analyzes and provides similarities of the content files. The content management method includes the steps of collecting content information from at least one content server which stores at least one content file corresponding to the content information; analyzing and storing similarities of the contents files stored in the content servers on the basis of the content information; retrieving similar content information on the basis of the similarities when a similar content file request is received through a communication network; and transmitting the similar content information through the communication network.

BRIEF DESCRIPTION OF THE DRAWINGS

The accompanying drawings, which are included to provide a further understanding of the invention and are incorporated in and constitute a part of this application, illustrate embodiments of the invention that, together with the description, serve to explain, by example, a principle of the invention. The drawings are as follows, the same or similar features being denoted by the same reference numbers throughout the several views.

DETAILED DESCRIPTION

Detailed descriptions of well-known functions and structures incorporated herein are omitted for conciseness and clarity of presentation.

Figure 1:
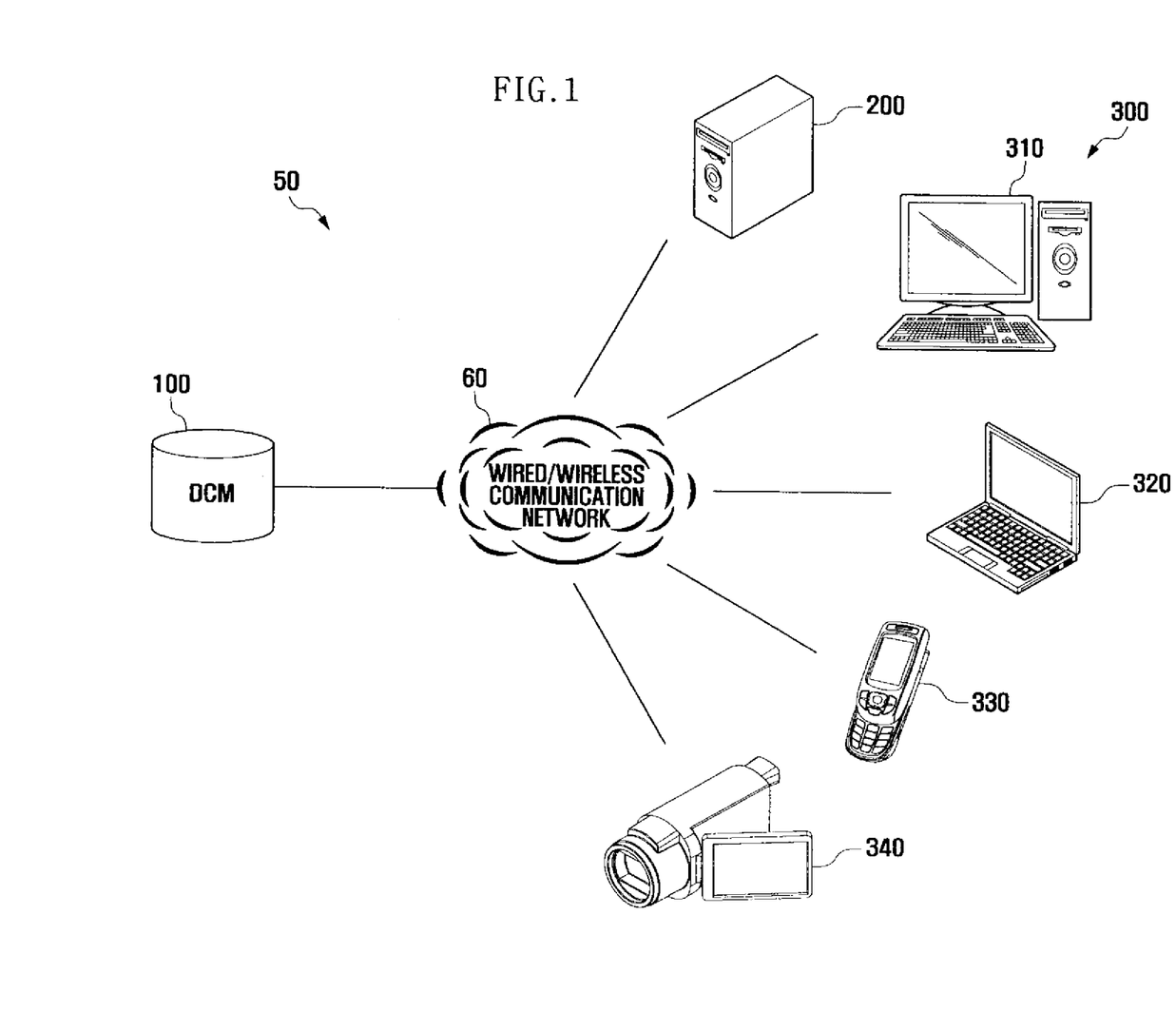
FIG. 1 is a schematic block diagram illustrating a contents sharing system according to an embodiment of the present invention.

FIG. 1 is a schematic block diagram illustrating an exemplary contents sharing system 50 according to an embodiment of the present invention. The contents sharing system 50 is implemented as a wired or wireless network 60 in which DCM 100, a contents server 200, and client 300 including a PC 310, a laptop computer 320, a mobile handset 330, and a camcorder 340 are interconnected. The devices operate with the same, preferably DLNA, communication protocols.

Each device can be directly connected to the DLNA system 50 or via an access point (AP). The AP is an intermediate node for connecting the devices to the DCM and having a Mobile-Network Connection Function (M-NCF).

Figure 2:
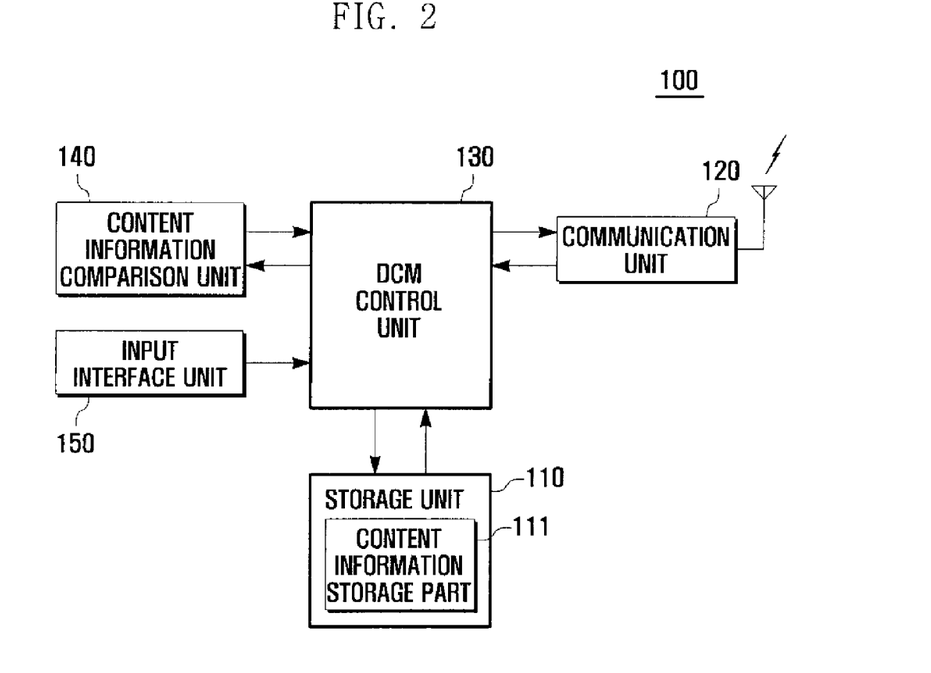
FIG. 2 is a block diagram illustrating the DCM engine of FIG. 1.

FIG. 2 shows, by way of illustrative and non-limitative example, the DCM of FIG. 1. The DCM 100 includes a storage unit 110, a communication unit 120, a DCM control unit 130, a content information comparison unit 140, and an input interface unit 150.

The storage unit 110 stores various contents and is provided with a contents information storage part 111 for storing determinations on similarities of the contents received from the contents server 200. Similarity analysis is performed under the control of the DCM control unit 130. Preferably, the content information includes a content identifier for identifying the content file and a content locator by which the content file is to be found.

The communication unit 120 supports the wired or wireless communication in sharing content. The communication unit 120, under the control of the DCM control unit 130, requests the contents information and receives the requested contents information from the contents server 200.

The communication unit 120 preferably uses the DLNA protocol in communicating with the contents server 200 and the clients 300.

The communication unit 120 can collect the contents information from more than one contents server 200, preferably utilizing the content identifier and the content locator.

When, in particular, the stored contents information differs from the received contents information, the communication unit 120 requests, from the corresponding contents server 200, the desired content file by using the content locator. In this manner, the DCM 100 maintains its content up-to-date.

Upon receiving the similar content file request from the client 300, the communication unit 120 retrieves, from the storage unit 110, the content information corresponding to the content information indicated by the similar content file request and transmits the requested content file to the client under the control of the DCM control unit 130. More particularly, upon receiving the similar content file request from the client 300, the communication unit 120 retrieves the content information indicated by the similar content file request from the storage unit 110. The communication unit 20 forwards the similar content file request to the contents server 200 indicated by the content locator included in the retrieved content information, receives the contents file from the contents server, and transmits to the client the content file received from the contents server.

DCM control unit 130 controls the overall operation of the DCM 100. Particularly, the DCM control unit analyzes the similarity of the content file received through the communication unit 120 to stored content information, and stores the analysis result in the contents information storage part 111. Similarity analysis is performed by any known and suitable method.

The DCM control unit 130, prior to performing the similarity analysis, determines whether predetermined conditions for collecting the contents information are satisfied and then controls the communication unit 120 to collect the content information from the contents server 200 if the conditions are satisfied. In particular implementations, the DCM control unit 130 determines whether the CPU occupancy rate of the DCM 100 is less than a predetermined reference occupancy rate, a predetermined interval for starting collection of the contents information has commenced, or the user has inputted a selection command for collecting the content information.

Preferably, the DCM control unit 130 analyzes the similarity of the contents file received from the contents server 200 and stores the analysis result into the storage unit 110. Preferably, the received contents file is erased after the similarity analysis is completed, thereby making available additional space in the storage unit 110.

The content information comparison unit 140 compares the previously stored contents information and the contents information collected subject to satisfaction of the conditions for collecting the contents information. If the previously stored contents information and the collected contents information differ from each other, the content information comparison unit 140 requests for the corresponding content file through the communication unit 120. The content is utilized in updating the content file, at this stage, and then discarded from DCM 100.

The input interface unit 150 enables the user to input commands, particularly, the contents information collecting request signal.

Figure 3:
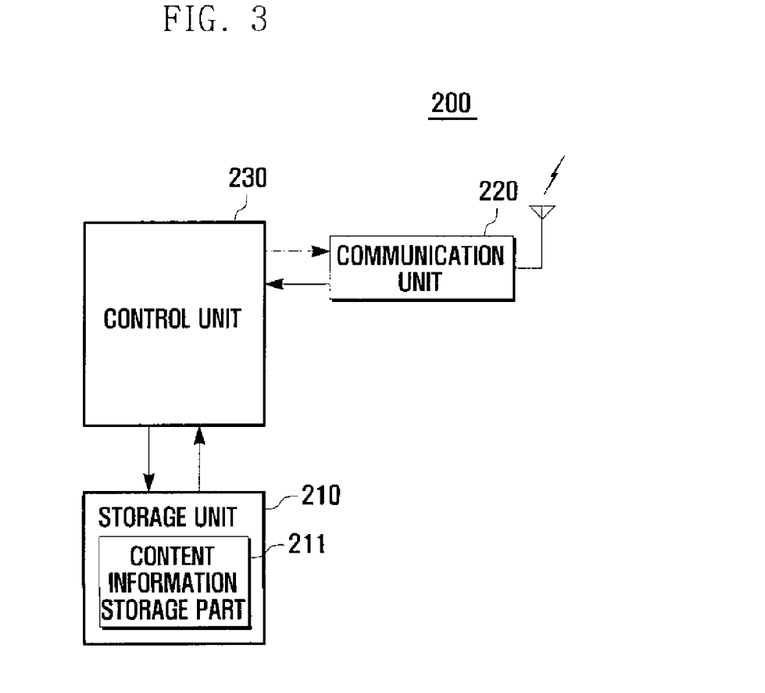
FIG. 3 is a block diagram illustrating the contents server of FIG. 1.

FIG. 3 is a block diagram illustrating the contents server 200 of FIG. 1. As shown in FIG. 3, the contents server 200 includes a storage unit 210, a communication unit 220, and a control unit 230.

The storage unit 210 stores the programs operating the contents server. The storage unit 210 includes a contents storage part 211 for storing the contents.

The communication unit 220 supports wired or wireless communication with other devices for sharing the content. The communication unit 220 receives the content information request from the DCM 100 and transmits the corresponding content information in response to the contents information request. Preferably, the contents server communicates with the clients 300 and the DCM 100 using the DLNA protocol.

Once reception is made of the contents information request for the contents information different from the contents information stored in the DCM 100, the communication unit 220 transmits the corresponding contents information in response to the contents information request.

The control unit 230 controls the overall operations of the contents server 200. Particularly, the control unit 230 transfers the content information corresponding to the contents stored in the storage unit 210 to the communication unit 220 in response to the content information request, and transfers the content file stored in the contents storage part 211 to the communication unit 220.

Figure 4:
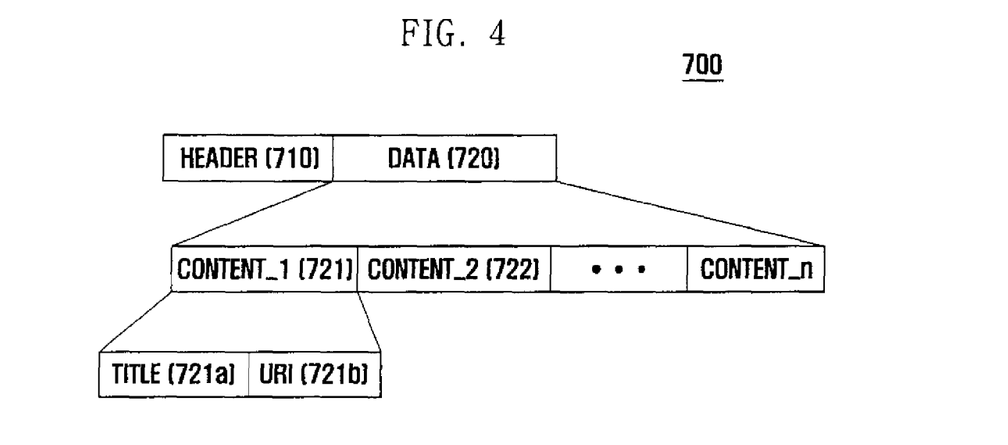
FIG. 4 is a message format illustrating a content information list message according to an embodiment of the present invention.

FIG. 4 is a drawing illustrating a message format of a content information list according to an embodiment of the present invention.

The content information list message 700 includes a header field 710 and a data field 720.

The data field 720 includes information fields 721, 722, . . . , n, and each content information field includes a content identifier 721a and a content locator 721b. The content locator is, for example, a uniform resource indicator (URI), which contains a content file access protocol, a host name (server), and a title of the content file represented by a directory path and name of the content file.

Figure 5:
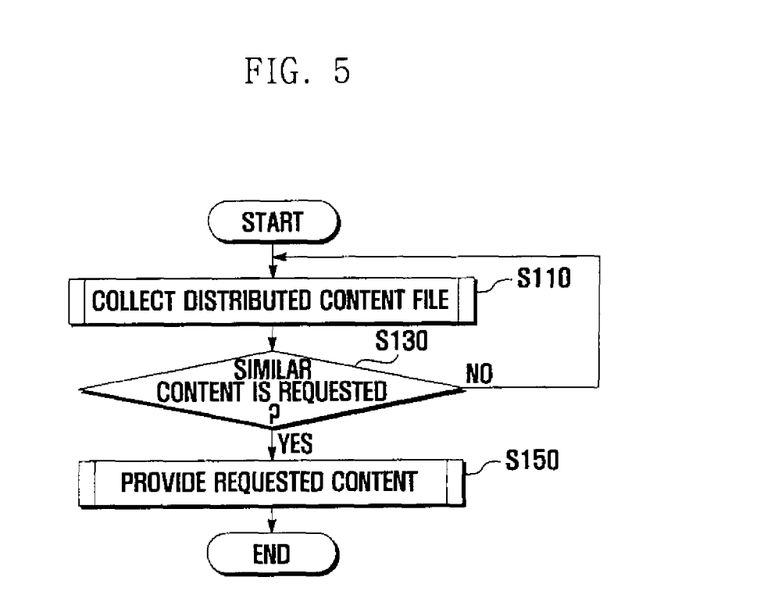
FIG. 5 is a flowchart for explaining a content management method according to an embodiment of the present invention.

FIG. 5 is a flowchart for explaining one possible realization of a content management method according to an embodiment of the present invention.

Referring to FIG. 2, FIG. 3, and FIG. 5, the DCM 100, in keeping up-to-date, iteratively collects the content information from a plurality of contents servers 200, which store the content corresponding to the content information, and stores the collected content information at step S110. The procedure for collecting and storing the contents information is described below with reference to FIG. 6 in more detail.

Next, the DCM 100 determines whether there exists a similar content file request received from the client 300 at step S130; retrieves the stored content information on the basis of the similar content file request, extracts the similar contents information from the retrieved content information, and then transmits the extracted to the client at step S150.

The content information extraction and transmission procedure of step S150 is described below with reference to FIG. 9A and FIG. 9B in more detail.

Figure 6:
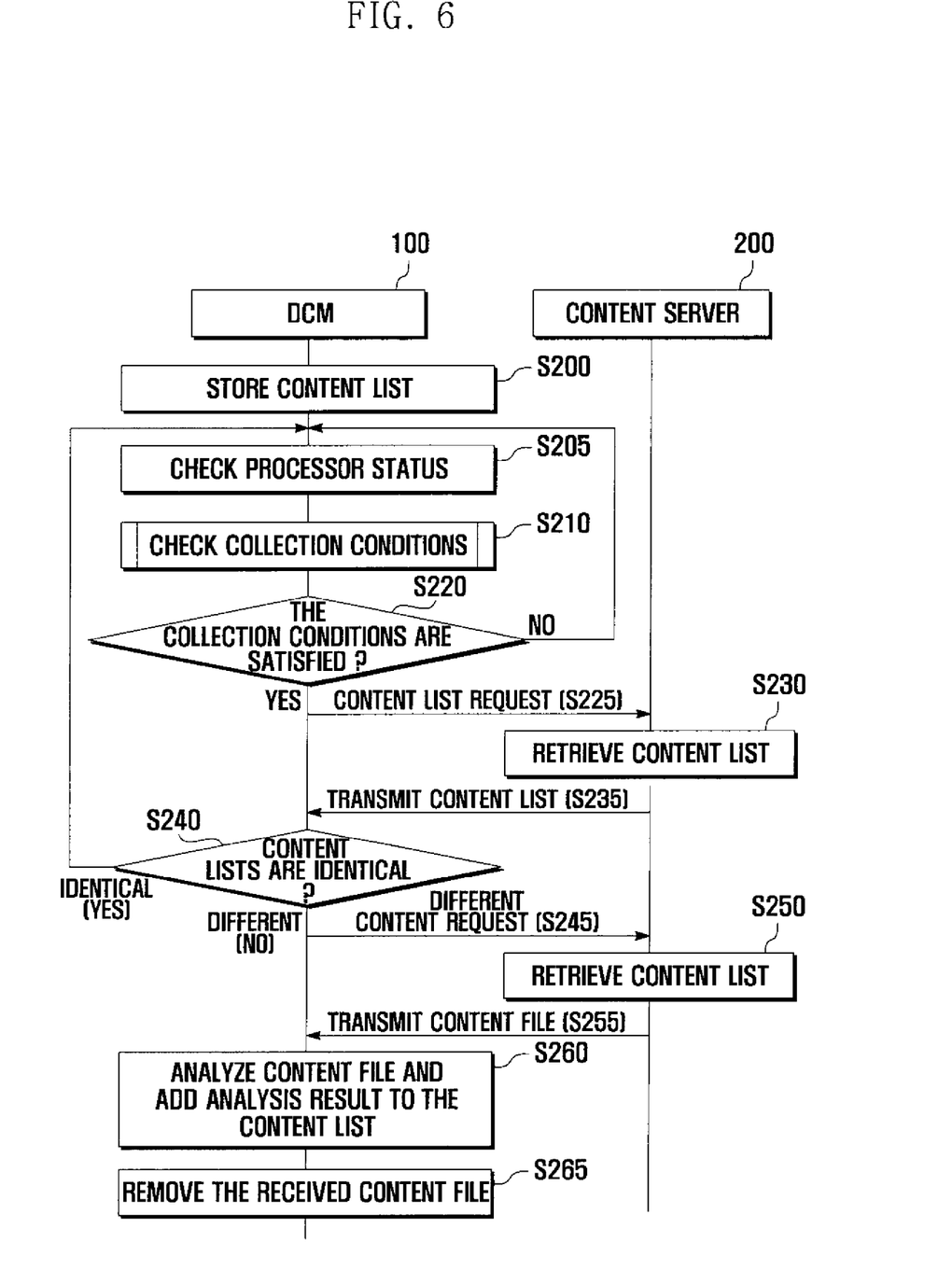
FIG. 6 is a flowchart for explaining the procedure for collecting the contents in FIG. 5 according to a first embodiment of the present invention.

FIG. 6 is a flowchart for explaining the content information collecting and storing procedure of FIG. 5 according to a first embodiment of the present invention.

Referring to FIG. 2, FIG. 3, and FIG. 6, the DCM 100 stores a content information list of the previously analyzed content at step S200 and checks the status of the central processing unit (CPU) at step S205. In case of no previously stored content information, the step S200 can be ignored.

Next, the DCM 100 checks the preset conditions for collecting the content at step S210. The preset conditions checking procedure is more fully described below with reference to FIG. 7A to FIG. 7C.

After checking the preset conditions, the DCM 100 determines whether the preset conditions are satisfied at step S220 and requests the content information list of the content stored in the contents servers 200 at step S225 if the preset conditions are satisfied. Here, the content information includes identification information for contents files and location information for guiding access to the contents.

The DCM 100 compares the previously stored content information list and the contents list received from the content servers at step S240. If the previously stored content information list is identical with the received contents list, the DCM goes back to the step S205.

On the other hand, if the previously stored content information list differs from the received contents list, the DCM 100 requests, of the content server 200, different content files using the location information included in the different content information of the received content information list, at step S245. Upon receiving the request from the DCM 100, the contents server 200 retrieves the requested content file from the content information list at step S250 and transmits the corresponding content file to the DCM 100 at step S255.

Next, the DCM 100 analyzes the received content file and then adds the analysis result to the content information list at step S260. After updating the content information list, the DCM 100 removes the received content file to thereby increase available storage space at step S265.

Figure 7A:
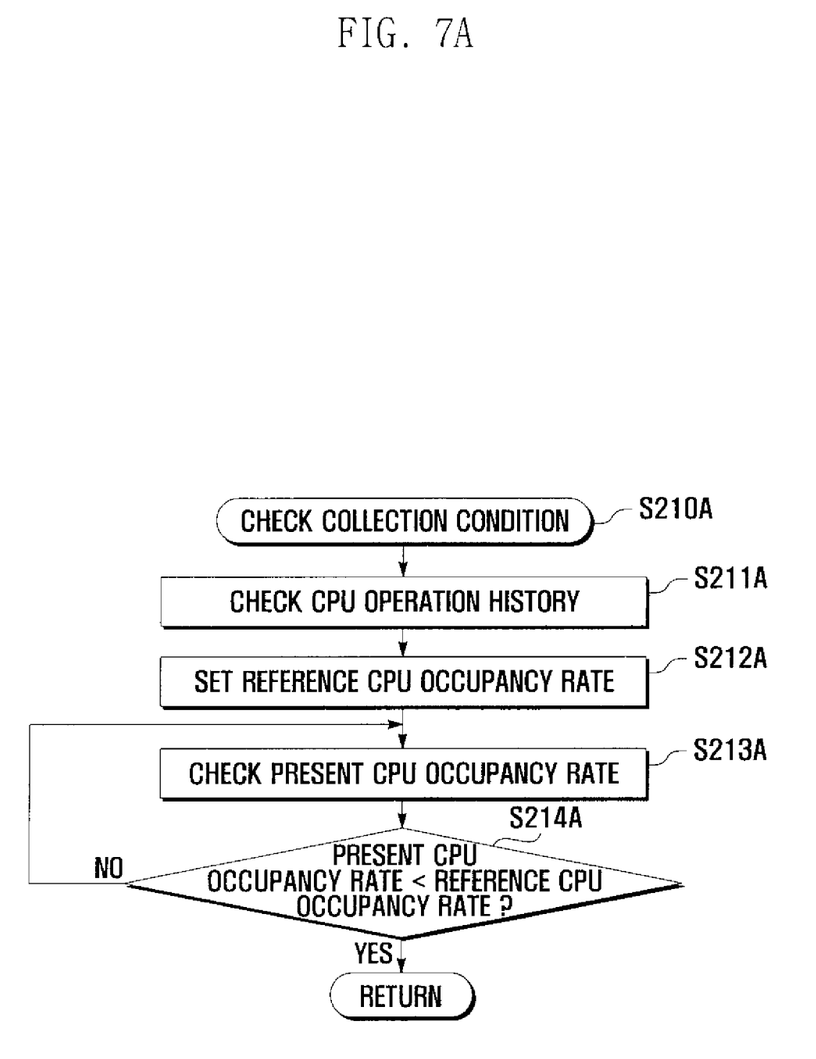
FIG. 7A is a flowchart for explaining the procedure for checking the collection condition in FIG. 6 when the condition is set to a waiting state.
Figure 7B:
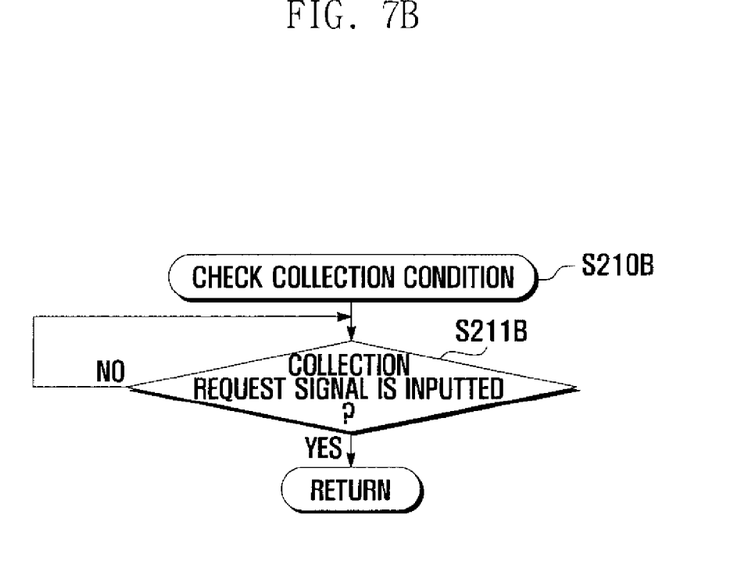
FIG. 7B is a flowchart for explaining the procedure for checking the collection condition in FIG. 6 when the condition is set to a preset cycle.
Figure 7C:
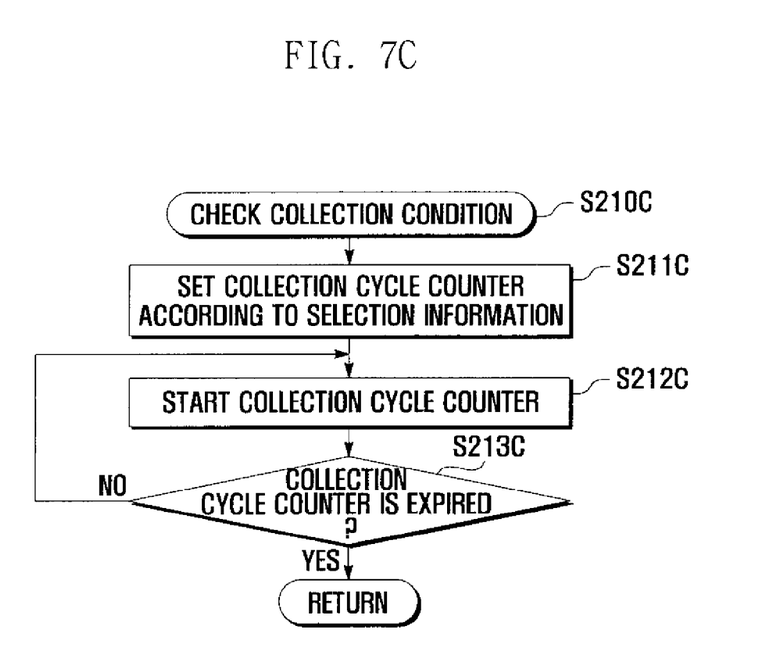
FIG. 7C is a flowchart for explaining the procedure for checking the collection condition in FIG. 6 when the condition is set to user's command.

FIG. 7A to FIG. 7C are flowcharts for explaining the preset conditions checking procedure of FIG. 6 in more detail.

FIG. 7A is a flowchart for explaining the procedure for checking the collection condition in FIG. 6 when the condition is set to a waiting state; FIG. 7B is a flowchart for explaining the procedure for checking the collection condition in FIG. 6 when the condition is set to a preset cycle; and FIG. 7C is a flowchart for explaining the procedure for checking the collection condition in FIG. 6 when the condition is set to user's command.

Referring to FIG. 2 and FIG. 7A, after checking the conditions for collecting the contents information at step S210a, the DCM control unit 130 accumulates a history of the CPU operations at step S211a and sets a reference CPU occupancy rate at step S212a. The DCM control unit 130 checks the present CPU occupancy rate at step S213a and determines whether the present CPU occupancy rate is less than the reference CPU occupancy rate at step S214a. The DCM control unit 130 controls the communication unit 120 to request the content information if it is determined that the present CPU occupancy rate is less than the reference CPU occupancy rate or, alternatively, less by a predetermined threshold. On the other hand, if the present CPU occupancy rate is greater than the reference CPU occupancy rate or, alternatively, greater by a predetermined threshold, the DCM control unit 130 goes back to perform the step S213a.

Referring to FIG. 2 and FIG. 7B, after checking the conditions for collecting the contents information at step S210b, the DCM control unit 130 determines whether a user command for collecting the contents information is inputted at step S211b and controls the communication unit 120 to request the contents information if it is determined that the user command is inputted. Otherwise, the DCM control unit 130 repeats step S211b.

Referring to FIG. 2 and FIG. 7C, after checking the conditions for collecting the contents information at step S210c, the DCM control unit 130 sets a counter determining a cycle length according to the information selected for collecting the contents information at step S211c. DCM control unit 130 counts the time at step S212c and determines whether the counter is expired for one cycle at step S213c. If the counter is expired, the DCM control unit 130 controls the communication unit 120 to request the content information. Otherwise, the DMC control unit 130 goes back to perform the step S212c.

Figure 8:
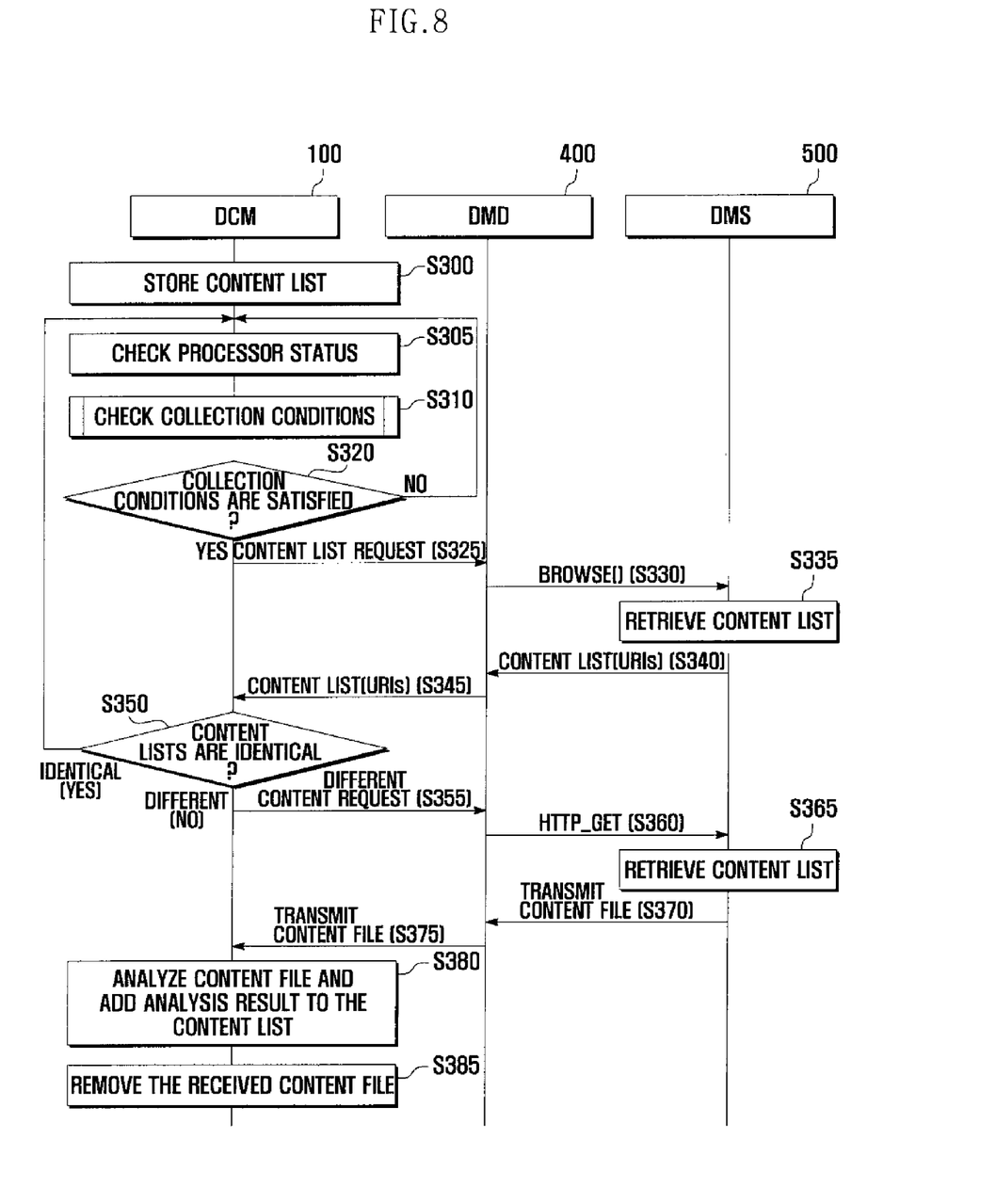
FIG. 8 is a flowchart for explaining the contents information collecting and storing procedure of FIG. 5 according to a second embodiment of the present invention.

FIG. 8 is a flowchart for explaining an example of the contents information collecting and storing procedure of FIG. 5 according to a second embodiment of the present invention.

Referring to FIG. 8, the DCM 100 stores the content information list of the previously analyzed content at step S300 and checks the status of the CPU at step S305. In case of no previously stored content information, the step S300 can be ignored.

Next, the DCM 100 checks the present condition for collecting the content at step S310. The present condition checking procedure has been described with reference to FIG. 7A to FIG. 7C.

After checking the preset conditions, and if the preset conditions are satisfied, the DCM 100 determines whether the preset conditions are satisfied at step S320 and requests, of a Digital Multimedia Downloader (DMD) 400, the content information list of the contents stored in Digital Media Servers (DMSs) 500 at step S325. The DMD 400 transmits a Browse message to the DMS 500 for searching the contents at step S330. The DMS 500 retrieves the content information list of the contents files stored in the storage 210 at step S335, and transmits the content information list to the DMD 400 using a Cont List (URLs) message at step S340. For simplicity of demonstration, the embodiment is depicted with merely a single DMS 500 to request the content information list.

The DMD 400 forwards the content information list in the form of Content List (URIs) message to the DCM 100 at step S345. Upon receiving the Content List (URIs) message, the DCM 100 compares the previously stored content information list to the content information list received from the DMS 500 at step S350.

If it is determined the previously stored content information list is identical to the received content information list, the DCM 100 returns to perform the step S305. Otherwise, the DCM 100 requests to the DMD 400 the content file which is informed in the received content information list but not in the previously stored content information list. The DCM 100 utilizes a Mismatch Content Request message, with reference to the location information of the content information which is listed in the received content information list but not in the previously stored content information list, at step S355.

Upon receiving the Mismatch Content Request message, the DMD 400 generates and transmits a HTTP_GET message to the DMS 500 in order to obtain the contents list corresponding to the location information contained in the Mismatch Content Request message at step S360. Upon receiving the Mismatch Content Request message, the DMS 500 reads out the content list to retrieve the mismatched content indicated by the location information of the Mismatch Content Request message at step S365. The DMS 500 transmits the retrieved mismatched content to the DMD at step S370. If the mismatched content is received, the DMD transmits the mismatched content to the DCM 100 at step S375.

Upon receiving the mismatched content, the DCM 100 analyzes the mismatched content file and stores the analysis result into the content information list at step S380. After the analysis, the received mismatched content file is removed to make the storage it occupies available at step S385.

Figure 9A:
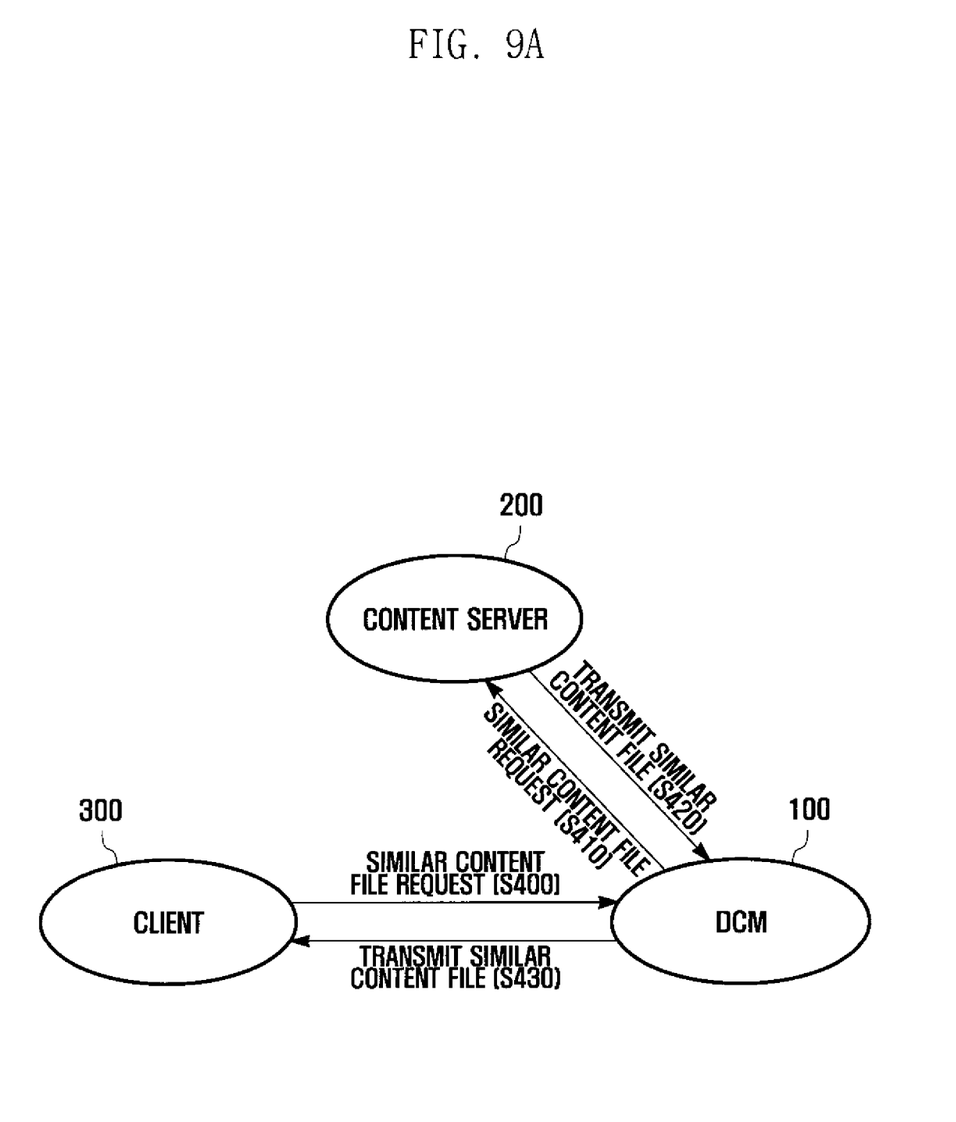
FIG. 9A is a diagram for explaining the contents information providing procedure according to a third embodiment of the present invention.
Figure 9B:
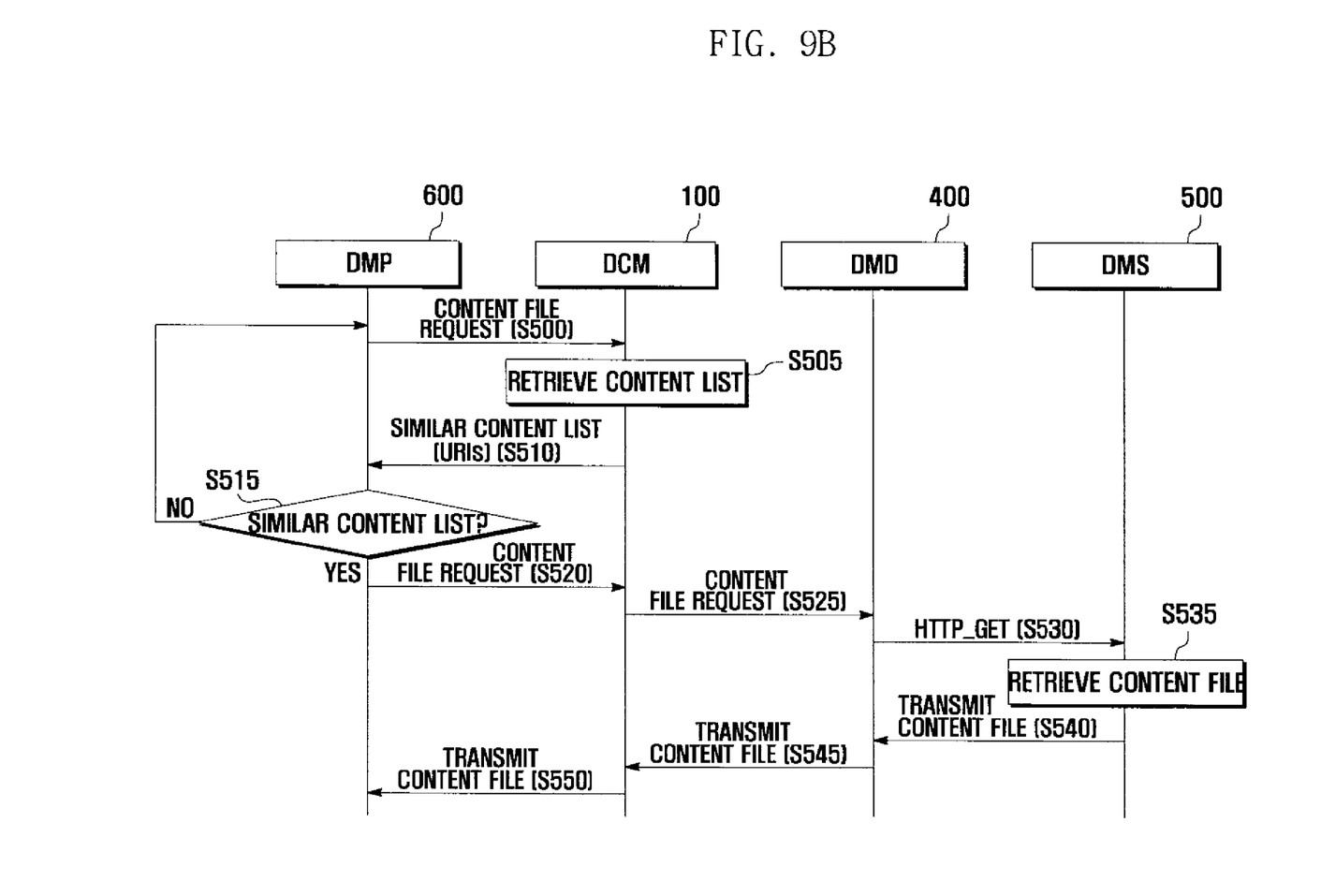
FIG. 9B is a flowchart for explaining the contents information providing procedure using the DLNA protocol according to the third embodiment of the present invention.

FIG. 9A is a diagram for explaining the content information providing procedure according to a third embodiment of the present invention, and FIG. 9B is a flowchart for explaining the content information providing procedure using the DLNA protocol according to the third embodiment of the present invention.

Referring to FIG. 2, FIG. 3, and FIG. 9A, if the client 300 requests, from the DCM 100, a content file or content files (S400), the DCM 100 retrieves, from its storage unit 110, content information associated with the requested content file(s). Note that the client requests a content file similar to one already stored at the client to the DCM in order to retrieve a similar content file. If the retrieved content information matches the requested content file(s), the DCM 100 then requests, from the content server 200 (S410), the content file(s) corresponding to the retrieved content information. The content server 200 transmits the content file(s) to the DCM 100 in response to the content file request at step S420. Upon receiving the content file(s), the DCM 100 forwards the content file(s) to the client 300.

Referring to FIG. 2, FIG. 3, and FIG. 9B, if the DMP 600 requests, from the DCM 100, a content file or content files (S500), the DCM 100 retrieves, from the storage unit 110, the content information list associated with the requested content file(s) (S505). The DCM 100 then transmits the retrieved content information list to the DMP 600 in the form of Cont List (URIs) message at step S510. Upon receiving the content information list, DMP 600 determines whether or not the requested content file(s) are on the received content list at step S515. If it is determined that the requested file(s) are on the received content list, the DMP 600 requests, from the DCM 100, at least one content file contained in the received content information list at step S520. If the DCM 100 is requested for the content file(s), the DCM 100 requests the content file(s) to the DMD 400 using DLNA protocol at step S525. If the DMD 400 receives the request for the content file(s), the DMD 400 generates and transmits an HTTP_GET message to the DMS 500 at step S530. Upon receiving the HTTP_GET message, the DMS 500 scans and retrieves the content list and retrieves the corresponding content file(s) at step S535. The DMS 500 then transmits the retrieved content file(s) to the DMD 400 at step S540. The DMD 400 forwards the content file(s) to the DCM 100 at step S545, and the DCM 100 forwards the content file(s) to the DMP 600 at step S550.

Figure 10A:
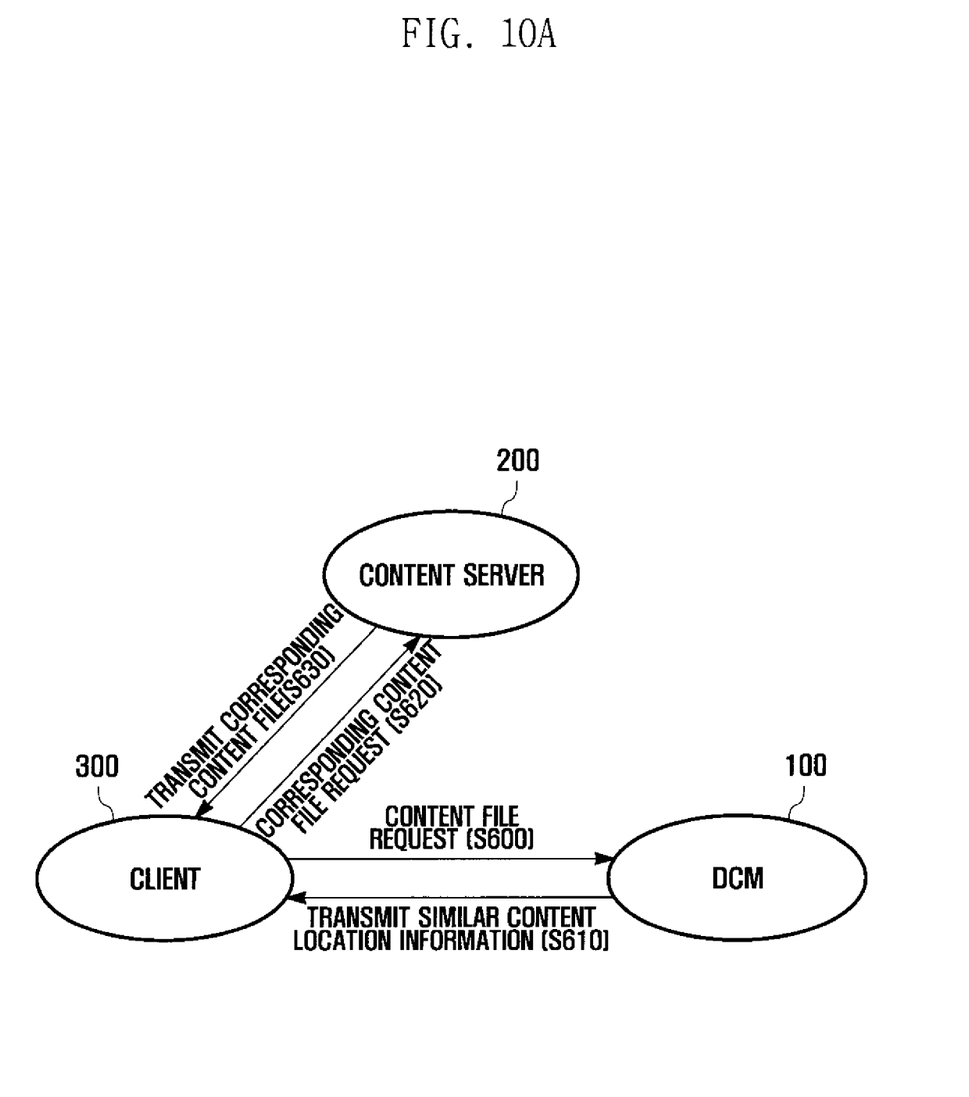
FIG. 10A is a diagram for explaining the contents information providing procedure according to a four the embodiment of the present invention.
Figure 10B:
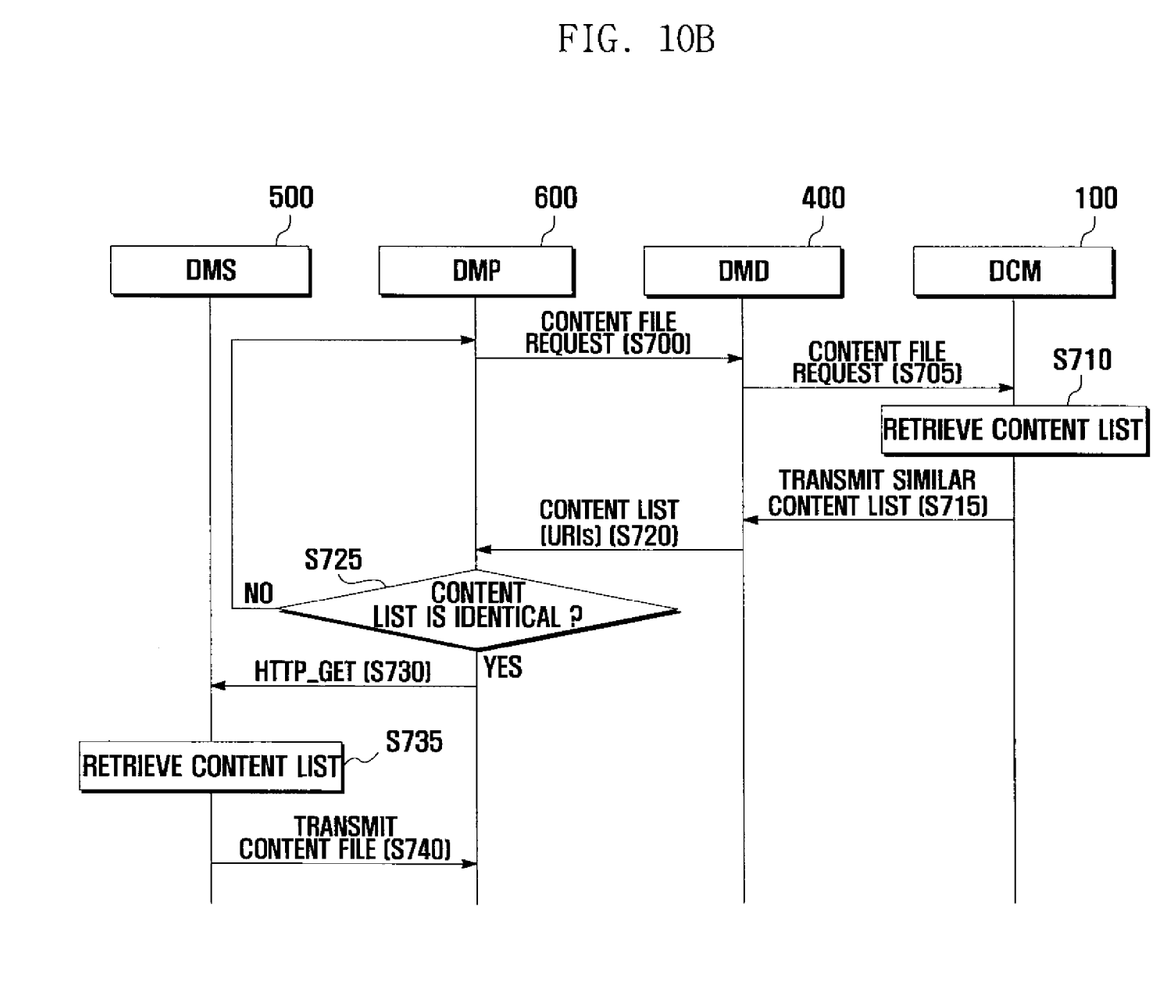
FIG. 10B is a flowchart for explaining the contents information providing procedure using the DLNA protocol according to fourth embodiment of the present invention.

FIG. 10A is a diagram for explaining the contents information providing procedure according to the fourth embodiment of the present invention, and FIG. 10B is a flowchart for explaining the contents information providing procedure using the DLNA protocol according to fourth embodiment of the present invention.

Referring to FIG. 2, FIG. 3, and FIG. 10A, if the client 300 requests, of the DCM 100, a content file at step S600, the DCM 100 retrieves similar content information by checking the content information list stored in the storage unit 110 in response to the similar content file request. The DCM 100 then transmits the retrieved content information to the client 300 at step S610. After receiving the content information, the client checks the location information contained in the received content information and requests, from the content server 200, the content file corresponding to the location information at step S620. Upon receiving the content file request message from the client 300, the content server 200 retrieves the content file, and transmits the retrieved content file to the client at step S630.

Referring to FIG. 2, FIG. 3, and FIG. 10B, if the DMP 600 requests, of the DMD 400, a content file using a content request message at step S700, the DMD 400 retransmits the content request message to the DCM 100 which stores the distributed contents information at step S705. Upon receiving the content request message, the DCM 100 checks its own content information list at step S710 and transmits the content information list to the DMD 400 at step S715. The DMD 400 forwards the content information list to the DMP 600 in the form of the Content List (URIs) message at step S720. Upon receiving the Content List (URIs) message, the DMP 600 determines whether the desired content file(s) are included in the received content information list at step S725. If it is determined that the desired content file(s) are on the received content information list, the DMP 600 transmits HTTP_GET message to the DMS 500 at step S730. Upon receiving the HTTP_GET message, the DMS 500 retrieves the content file stored in the storage unit 210 at step S735 and transmits the retrieved content file to the DMP 600 at step S740.

As described above, the content management technique of the present invention enables a device equipped with a DCM engine to collect the content files distributed over the network, analyze the similarities of the collected content files, and store the similarities, such that it is possible to provide the content files on the basis of the similarities when an specific content file is requested by other devices.

What is claimed is:

1. A content management server which analyzes similarities of content files distributed over a network and provides similarities information, comprising:
   a communication unit which collects content information from at least one content server storing the content files and the content information corresponding to the content files;
   a digital content management (DCM) control unit which analyzes similarities of the content files received from the content server;
   a DCM storage unit which is locally coupled to the DCM control unit and stores information on the similarities of the content files analyzed by the DCM control unit; and
   a content information comparison unit which detects the content information in response to a similar content file request transmitted from a client on the basis of the similarities information of the content files;
   wherein when content information stored in the DCM storage unit and analyzed by the DCM control unit differs from received content information from said at least one content server, the content information comparison unit requesting a particular content file corresponding to the received content information from the at least one content server accessed over a network through the communication unit to update the content information in the DCM storage unit to match identically with the content information received from the content server after updating the content information in the storage unit.

2. The content management server of claim 1, wherein the DCM control unit checks preset content collection conditions and controls the communication unit to collect the content information from the content server if the content collection conditions are satisfied.

3. The content management server of claim 2, wherein the communication unit requests the content information to the content server and receives the content information from the content server.

4. The content management server of claim 2, wherein the DCM control unit determines whether a CPU occupancy rate of the content management server is less than a preset reference occupancy rate for checking that the content collection conditions are satisfied.

5. The content management server of claim 2, wherein the DCM control unit determines whether a counter for starting content information collection cycle is expired for checking that the content collection conditions are satisfied.

6. The content management server of claim 2, wherein the DCM control unit determines, in checking that the content collection conditions are satisfied, whether an input command for collecting the content information has been received.

7. The content management server of claim 2, wherein the communication unit requests a content file corresponding to the location information contained in the content information, receives the content file from the content server, and transmits the content file received from the content server to client through a communication network.

8. The content management server of claim 1, wherein the communication unit communicates with the content server and clients using a digital living network association (DLNA) protocol.

9. The content management server of claim 1, wherein the content information includes content identification information and content location information.

10. The content management server of claim 9, wherein the DCM control unit requests, from the content server, the content file on the basis of location information contained in the different content information and receives the corresponding content file from the content server.

11. The content management server of claim 10, wherein the DCM control unit analyzes the similarities of the collected content files and stores information on the similarities.

12. The content management server of claim 10, wherein the DCM control unit removes the collected content files after completing the similarity analysis.

13. The content management server of claim 1, wherein the communication unit transmits the content information having content identification information and content location information.

14. The content management server of claim 1, wherein the content files and content information are distributed over a Digital Living Network Alliance (DLNA).

15. A content management method for a content management server which analyzes and provides similarities of a plurality of content files distributed over a communication network, comprising:

collecting content information from at least one content server which stores at least one content file corresponding to the content information;

on the basis of the content information, analyzing and storing similarities of the contents files distributed over the communication network among a plurality of content servers;

retrieving similar content information on the basis of the similarities when a similar content file request is received through the communication network; and transmitting the similar content information through the communication network;

wherein the step of analyzing and storing the similarities includes:

comparing the previously stored content information from a local digital content management (DCM) storage unit coupled to a DCM control unit with the collected content information;

receiving a content file in which at least some of the collected content information is not in the previously stored content information;

analyzing similarities of the received content file, and storing the similarity analysis result; and updating the content information stored in the local DCM storage unit to match identically with the content file received from the content server after updating the content information in the storage unit.

16. The method of claim 15, wherein the step of collecting the content information includes:

determining whether or not preset content information collection conditions are satisfied;

requesting content information to content servers which store content files corresponding to the content information; and receiving the content information from the respective content servers.

17. The method of claim 16, wherein the step of determining whether or not the preset content information collection conditions are satisfied includes determining whether or not CPU occupancy rate of the content management server is less that a predetermined reference occupancy rate.

18. The method of claim 16, wherein the step of determining whether or not the preset content information collection conditions are satisfied includes determining whether or not a counter for starting a content information collection cycle is expired for checking that the content collection conditions are satisfied.

19. The method of claim 16, wherein the step of determining whether or not the present content information collection conditions are satisfied includes determining whether an input command for collecting the content information has been received.

20. The method of claim 15, wherein the content information is collected using a digital living network association (DLNA) protocol.

21. The method of claim 15, wherein the content information includes content identification information and content location information.

22. The method of claim 21, wherein the content file is received using location information contained in the content information which is informed in the collected content information but not in the previously stored content information.

23. The method of claim 22, wherein the content file is received using a digital living network association (DLNA) protocol.

24. The method of claim 21, the step of storing the similarity analysis result includes removing the collected content file.

25. The method of claim 15, wherein the content information includes identification information and location information of the corresponding content file.

26. The method of claim 15, wherein the step of transmitting the similar content information includes:

requesting, from the content server, content file corresponding to location information of the content file;

receiving the requested content file from the content server; and transmitting the content file received from the content server.

27. The method of claim 15, wherein the similar content information is transmitted using a digital living network association (DLNA) protocol.

28. The method of claim 15, wherein the content files and content information are distributed over a Digital Living Network Alliance (DLNA).

* * * * *